F. J. ZIMMERMAN.
GRAIN ELEVATOR WAGON DUMP AND CONVEYER MECHANISM.
APPLICATION FILED MAY 12, 1910.
1,029,332.
Patented June 11, 1912.
2 SHEETS—SHEET 1.
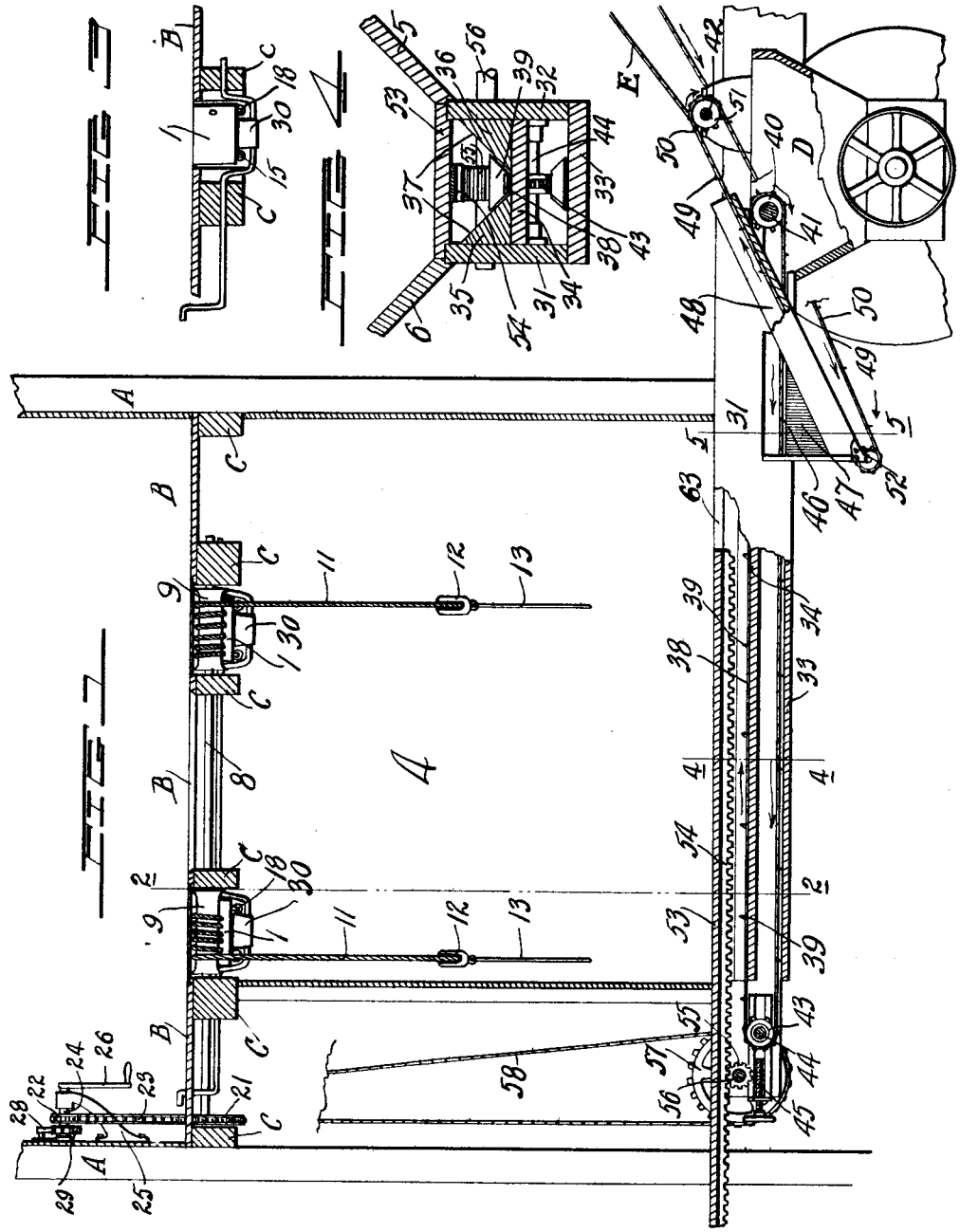
Witnesses
Inventor
Frederick J. Zimmerman

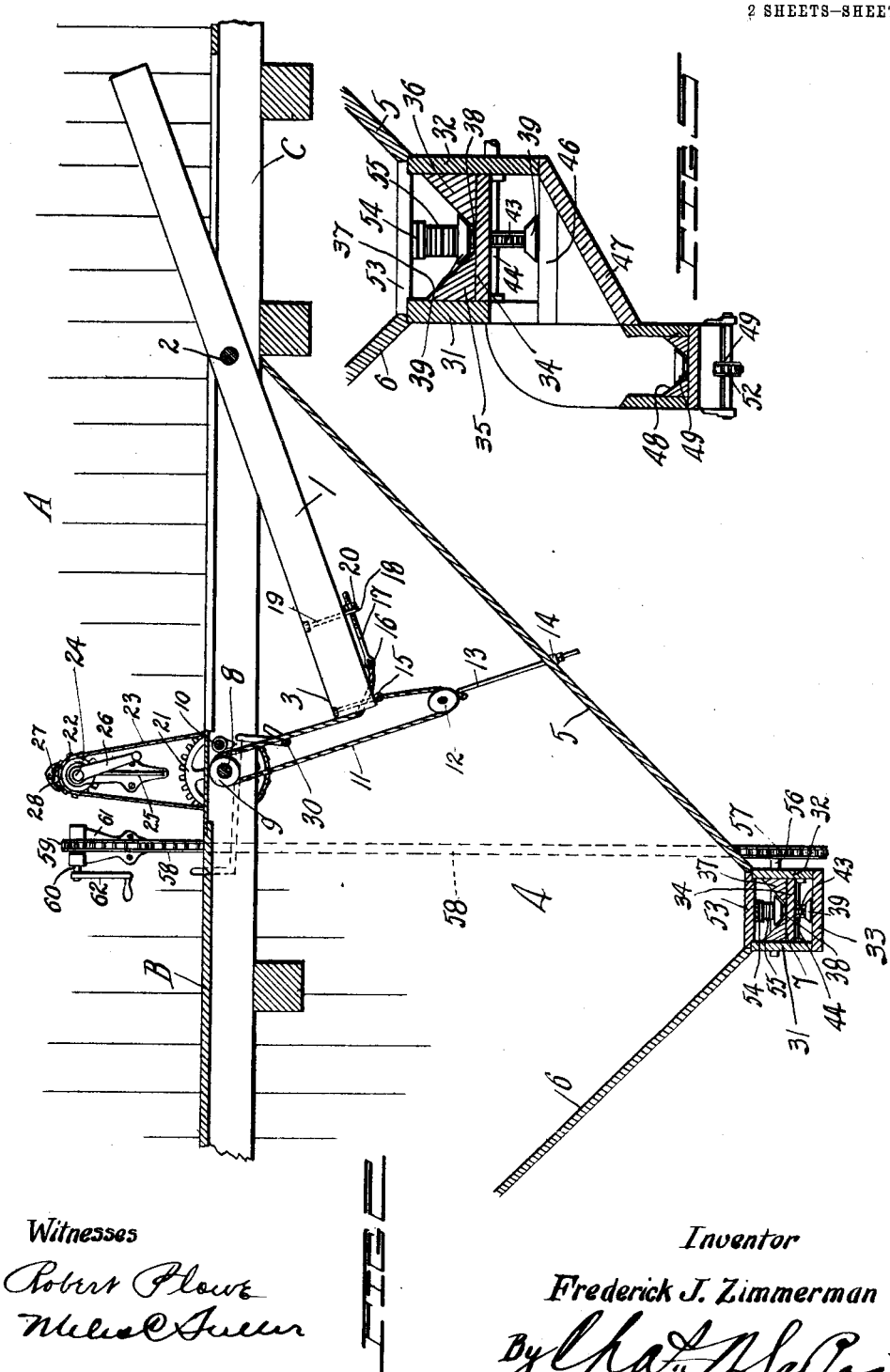

UNITED STATES PATENT OFFICE.

FREDERICK J. ZIMMERMAN, OF ATHENS, ILLINOIS.

GRAIN-ELEVATOR WAGON-DUMP AND CONVEYER MECHANISM.

1,029,332. Specification of Letters Patent. Patented June 11, 1912.

Application filed May 12, 1910. Serial No. 560,875.

*To all whom it may concern:*

Be it known that I, FREDERICK J. ZIMMERMAN, a citizen of the United States, residing at Athens, in the county of Menard and State of Illinois, have invented certain new and useful Improvements in Grain-Elevator Wagon-Dump and Conveyer Mechanism, of which the following is a specification.

This invention has reference to a new and improved grain dump and dump conveyer for use in an elevator, and refers more particularly to a type of manually controlled wagon dump logs, and to a conveyer in which the chain returns underneath the conveyer trough.

One of the objects of the invention is to provide a drum and cable means for operating the dump logs, such that it will be safe, convenient, and at the same time not interfere with the size or location of the dump bin.

To the accomplishment of the foregoing and such other objects as may hereinafter appear, my invention consists in the construction, combination and arrangement of parts hereinafter described and then sought to be defined in the appended claims, reference being had to the accompanying drawings forming a part hereof and which illustrate merely a preferred embodiment of my invention, it being understood that the details and construction thereof may be varied within the scope of the claims without digressing from my inventive idea.

For a more complete and thorough understanding of this invention, reference is had to the accompanying drawings, in which,—

Figure 1 is a sectional view taken through the dump bin, parts being shown in section, parts in elevation, and parts broken away, in order to more clearly show the details of the device, the dump logs being here shown in their horizontal position and the conveyer trough cover being partly closed; Fig. 2 is a longitudinal section of the dump as the same would appear if taken on the line 2—2 of Fig. 1, the dump logs being shown in the lowered position; Fig. 3 is a sectional detail showing one type of locking irons that may be used as a precautionary means for securing the dump logs in horizontal position; Fig. 4 is an enlarged section of the main conveyer drag as the same would appear if taken on the line 4—4 of Fig. 1, looking in the direction of the arrow; and Fig. 5 is an enlarged section as the same would appear on the line 5—5 of Fig. 1, looking in the direction of the arrow, showing the auxiliary conveyer.

Like characters of reference indicate corresponding parts throughout the figures.

In the drawings A A represent the side walls of the driveway of an elevator, and B indicates the flooring of the driveway supported on beams or joists C. The two wagon dump logs 1 are pivoted at 2, each between two of the beams C. The rear ends 3 of the dump logs 1 extend over the grain dump bin 4, so that when a wagon is placed on the dump logs 1 and dumped, the grain will run directly into the bin 4. Said bin has the sloping sides 5 and 6, the side 5 extending up under the dump logs 1. At the bottom of the bin 4 is the conveyer trough 7 to be described.

Adjacent the rear ends 3 of the dump logs 1 and lying in a transverse direction to the extent of said dump logs, is a shaft 8 which is journaled in the beams C. Wooden drums 9, one for each dump log 1, are immovably carried on said shaft 8. Just enough space is left between said drums 9 and the rear ends 3 of said dump logs 1 to allow the presence of rollers 10, one for each dump log, said rollers 10 being provided for the wheels of the wagon to ride against as the dump is lowered. Cables 11, which are preferably Swedish wire tiller rope or some similar pliable wire cable, are wrapped with a plurality of turns, one cable about each of the drums 9, said plurality of turns being preferably six or more. One end of each of said cables is passed down through a pulley 12, said pulley being secured by means of a rod 13 to the side 5 of the grain bin 4 as at 14. After passing through said pulley 12 said cable 11 is secured on the under side of the end 3 of the dump log 1 to the bolt 15. This end of the cable 11 is the end that leaves the drum 9 on the side farthest removed from the end 3 of the dump log 1. The other end of the cable 11 is brought directly to the under side of the end 3 of the dump log 1 where it is secured to the eye 16 of a bolt 17. The opposite end of bolt 17 passes through an eye 18 of a bolt 19, and is adjustably held in this position by a nut 20 on said bolt 17, the bolt 19 being secured to the dump log 1. It can readily be seen that by tightening the nut 20 the cable 11 can always be kept taut so that there will be no lost motion in its operation.

Carried on one end of shaft 8 and near one of the walls A is the sprocket wheel 21, said sprocket being much larger than a sprocket 22 to which it is connected by the sprocket chain 23. Said sprocket 22 is immovably carried on the short shaft 24 which is journaled in and supported by a bracket 25 attached to the wall A of the elevator drive. The bracket 25 is preferably placed at a sufficient height above floor B to allow a person to operate the wagon dump by means of the crank handle 26 on the outer end of shaft 24. Turning the crank 26 to the right will operate the shaft 8 through the sprocket chain connection between sprockets 21 and 22 and cause the cables 11 to be drawn up on the side of the drums 9 opposite dump logs 1 and to be paid out on the side nearest the dump logs 1, thus causing the ends 3 of the dump logs to be steadily lowered to dump the grain from the wagon. To raise the dump logs to a horizontal position again the crank 26 is operated to the left thus raising the logs entirely by manually controlled power and giving the operation of the entire mechanism into complete control of the operator in case of accident, and at the same time eliminating any sudden jolting or jarring of the wagon.

Two separably operated dogs 27 and 28 are secured to the bracket 25 and are arranged to have engagement with the straight toothed ratchet wheel 29, when thrown into locking position, said wheel 29 being secured to the shaft 24, one dog locking shaft 24 against rotation in one direction and the other preventing its turning in the opposite direction. It is thus possible to quickly and easily lock the dump logs in any desired position by locking the shaft 24 against rotation. As a further precautionary provision against the unexpected and frequently disastrous lowering of the dump logs, the locking irons 30 of any well known or desired construction may be provided without interfering with or being impeded in their operation by the cable operating means here disclosed. But such provision would be merely a precaution and unnecessary, as the dogs 27 and 28 obviously form perfect security against accidental lowering of the dump logs. It can easily be seen that by this use of cables as operating means for lowering and raising the dump logs, it becomes unnecessary to place a large amount of cumbersome mechanism within the grain bin, or to make the bin smaller to provide a place for this mechanism, and more particularly this structure allows the bin to occupy the very desirable space up under the dump logs. It is apparent that the cables 11 occupy practically no space at all in the grain bin 4, and that the cables 11 and the pulleys 12 would be in no way impaired in their operation, even should grain be closely packed around the same.

In detail the conveyer trough 7 consists of two side pieces 31 and 32, and the bottom floor or covering 33 forming a conveyer box running entirely across the center of the bottom of the grain bin 4, and extending to the sheller D or to an elevating device where no sheller is used. Intermediate the top and bottom edges of the sides 31 and 32 of the conveyer drag 7 is the main drag floor plank 34 dividing the conveyer box into an upper and lower section. Blocks 35 and 36 having a triangular cross section are placed in the upper section of the conveyer box forming a somewhat V-shaped trough as at 37. Through this trough runs the conveyer chain 38, said chain having attached thereto at regular intervals the lugs or cleats 39. Said chain 38 operates to draw the grain through the trough 37 to the hopper of the sheller D, being operated from the end nearest the said sheller by engagement with sprocket wheel 40 which is carried on shaft 41. Said shaft 41 is operated by having in turn a chain and sprocket connection with a shaft 42, which shaft is driven by some suitable power, preferably operating through the chain E. The chain 38 after discharging the grain into the hopper D rides under on the sprocket 40 and returns through the lower section of the conveyer box 7, traveling on the floor 33. At the opposite end it rides up over an idler sprocket 43 carried on a short shaft 44, said shaft being arranged to be adjustable for the purpose of tightening the chain 38 by any approved means shown as 45.

An opening 46 is provided in the floor 33 of the main drag box. As the chain 38 in its return passes over the opening 46 all "slobbered" grain will fall through said opening onto an inclined slide 47, and be deposited thereby into the auxiliary conveyer trough 48. The grain will then be carried up through this trough 48 and deposited into the hopper D by a conveyer chain 49 having cleats or lugs 50, said chain being operated by a sprocket 51 carried on shaft 42, the opposite end of said chain passing over an idler sprocket 52, said chain returning from sprocket 51 to sprocket 52 freely suspended underneath trough 48. An adjustable sliding cover 53 for trough 37 is arranged to slide with its edges resting each on an upper edge of one of the sides 31 and 32 of the drag box 7. Said cover 53 has attached to its under side and running longitudinally thereof, a rack 54, said rack engaging a pinion 55 carried on a shaft 56. On one end of shaft 56 is fixed the sprocket wheel 57 which is operatively connected by a sprocket chain 58 to the sprocket 59. Said sprocket 59 is carried on a shaft 60 journaled in and supported by a bracket 61. Said bracket 61 is attached to one of the walls A of the elevator driveway, being preferably the same wall to which the bracket 25 is attached, and said bracket 61 is so placed that a person can easily adjust the trough cover 53 by means of a crank 62 attached to shaft 60. By operating this crank 62 the slide 53 can be adjusted to cover as much of the conveyer trough as desired. Thus when the bin 4 is almost full of grain, only a small part of the trough is left open, as at 63, thereby permitting only the desired amount of grain to feed into the trough and making it unnecessary for the conveyer chain to drag through the grain for the entire length of the bin. As the bin is emptied of grain the cover 53 can be moved back to allow the grain to continue to feed into the trough until when there is no longer any grain in the bin the entire length of the trough will be uncovered. It is easily seen that this device eliminates much of the wear and tear on the conveyer chain, prevents it from feeding into the hopper faster than desired, and also keeps the drag from choking up and breaking the chain.

The general results attained in an elevator dump of this construction and design are cheapness and simplicity of structure, ease and safety in operation, and convenience in the arrangement and location of the various parts, such as is not successfully attained by any form of device now in use.

Having thus fully described my invention, what I claim and desire to secure by Letters Patent of the United States, is,—

1. In a grain elevator wagon dump, the combination with a pair of dump logs, of a shaft, a drum carried on said shaft, a flexible cable wrapped on said drum, having one of its ends attached directly to one of said dump logs, and the other end passing through a pulley fixed beneath said dump log, and thence being secured to said dump log, and means for operating said shaft whereby the said cable may be caused to lower and raise said dump logs.

2. In a grain elevator wagon dump, the combination with a pair of dump logs, of a shaft, a pair of drums on said shaft, a pair of flexible cables one wrapped on each of said drums, each cable having its opposite ends attached to one of said dump logs, one of the ends of each of said cables, passing through a pulley secured beneath each of said dump logs before being attached to said dump logs, and means for operating said shaft whereby said cables lower or raise said dump logs.

3. In a grain elevator wagon dump, the combination with a pair of dump logs, of a shaft carried beneath the elevator driveway floor, a pair of drums on said shaft, a pair of flexible cables wrapped one on each of said drums, and attached to said dump logs, a hand crank shaft carried above said elevator driveway floor, a chain and sprocket connection between said crank shaft and said first mentioned shaft, whereby a manually controlled operation of said crank shaft will raise and lower said dump logs, and means for locking said crank shaft against rotation, whereby said dump logs may be held immovable in any desired position.

4. In an apparatus of the character described, in combination, pivoted dump logs, a receiving bin disposed below one end of the dump logs and having an inclined wall extending to a point approximately centrally beneath said dump logs, and operating means for the dump logs comprising gearing and flexible connections between said gearing and the ends of the dump logs operating in the bin.

5. In an apparatus of the character described, in combination, pivoted dump logs, a receiving bin located beneath the dump logs, an operating shaft, cables connecting said shaft with said dump logs, guiding pulleys for the cables, said pulleys disposed within the bin and beneath the dump logs, and manually controlled means for operating said shaft.

6. In an apparatus of the character described, in combination, pivoted dump logs, a bin in which a portion only of said logs oscillate, an operating shaft extending transversely to the extent of said logs, connections between said shaft and said logs, a second shaft, means for operating said shaft, connections between the shafts, and means for locking the second shaft and thereby lock said dump logs.

In testimony whereof I affix my signature, in presence of two witnesses.

FREDERICK J. ZIMMERMAN.

Witnesses:
A. T. KINCAID,
JOE JOHNSON.